United States Patent [19]

Wakabayashi et al.

[11] Patent Number: 4,710,976
[45] Date of Patent: Dec. 1, 1987

[54] OPTICAL REPEATER MONITORING SYSTEM

[75] Inventors: Hiroharu Wakabayashi; Yasuhiko Niiro, both of Kanagawa, Japan

[73] Assignee: Kokusai Denshin Denwa Co., Ltd., Tokyo, Japan

[21] Appl. No.: 731,642

[22] Filed: May 7, 1985

[30] Foreign Application Priority Data

May 16, 1984 [JP] Japan .................... 59-96662

[51] Int. Cl.$^4$ ................................ H04B 9/00
[52] U.S. Cl. .................... 455/601; 370/13.1; 375/4; 379/4; 455/9
[58] Field of Search ............ 455/9, 23, 601; 375/3, 375/4; 370/13.1; 379/4

[56] References Cited

U.S. PATENT DOCUMENTS

| | | | |
|---|---|---|---|
| 4,211,920 | 7/1980 | Wakabayashi | 455/601 |
| 4,300,239 | 11/1981 | Wakabayashi et al. | 455/601 |
| 4,334,303 | 6/1982 | Bertin et al. | 370/13.1 |
| 4,586,186 | 4/1986 | Anderson | 455/601 |

*Primary Examiner*—Joseph A. Orsino, Jr.
*Attorney, Agent, or Firm*—Armstrong, Nikaido, Marmelstein & Kubovcik

[57] ABSTRACT

An optical repeater for an optical digital transmission line has a pair of in-service monitoring circuits (55, 55') each of which includes a flip-flop (57) for dividing frequency of transmission data to derive commands and burst carrier in the first line (54). A counting means (59, 61) is provided for detecting parity errors and counting the errors in an opposite second line (65). A timing generation means (62) is provided for reading out the counting means (61) upon receipt of the burst carrier. A phase modulator (64) provides phase modulation to a clock pulse in an opposite second line (65) according to the output of the timing generation means (62). The number of errors in the second line (65) is stored in the counting means (61) according to commands in a first line (54) from a terminal transmitter (52). The content of the counting means (61) is forwarded to a terminal receiver (66) through phase modulation of clock pulses in a second line (65) upon receipt of the burst carrier. The commands and burst carrier are constituted by arranging parity bits of in-service data in the first line (54).

4 Claims, 7 Drawing Figures

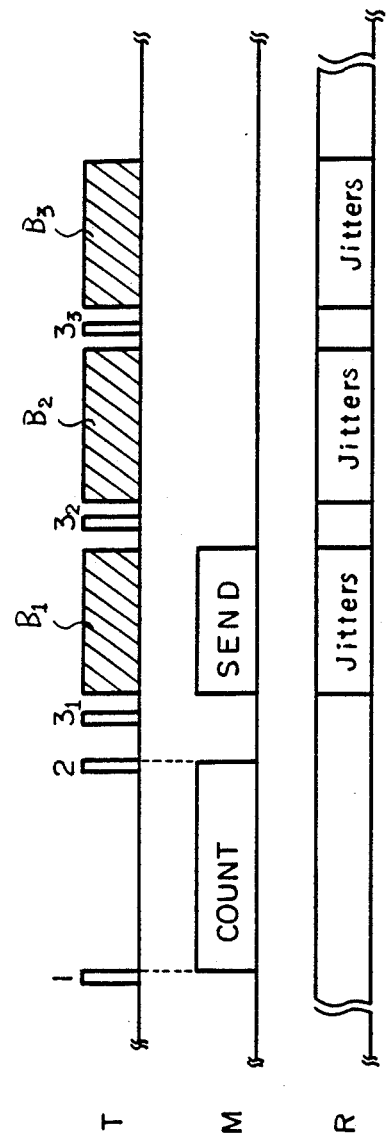

OPTICAL REPEATER MONITORING SYSTEM

BACKGROUND OF THE INVENTION

The present invention relates to an optical digital transmission system monitoring system, in particular, it relates to such a system which does not request an interstitial monitoring line.

In a digital transmission system which includes repeaters, an error rate measurement in each repeater section is needed to monitor the operation of the repeaters, and to locate the fault position of the transmission line.

Conventionally, there have been two monitoring systems. The first is an out-service method which measures the line by sending a particular signal in the line after stopping the communication service. The second is an in-service method which measures the line by interposing a particular test signal on a commercial signal without stopping the communication service.

In an out-service method, a return path between an upward line and a downward line is provided in a repeater for test purposes, so that a test signal from a transmission station returns to the transmission station through the repeater. The out-service method has the advantage that it does not require an interstitial cable for test purposes.

In an in-service method, a parity bit of a communication signal is handled so that it indicates error information, which is returned to a transmission station through an interstitial line (CCITT report COM X VIII No. 59-E 1977 August). However, an in-service method has the disadvantage that particular repeaters, for an interstitial line itself, are required for a long transmission line. Therefore, a prior in-service method is not cost effective and operationally reliable.

A prior in-service method is described in accordance with FIGS. 1 through 3.

FIG. 1(a) shows a signal which is transmitted to a line. The numerals 11, 12, 13, 14 and 15 are signal blocks, and numerals 21, 22, 23, and 24 are parity bits. It is assumed that an even parity law is followed, that is, if the number of marks (1) in the block 11 is even, the parity 21 is "0", and if that number is odd, the parity 21 is "1". Assuming that the parity bit 21 is included in the block 11, the number of marks in the block 11 which includes the parity 21 is always even. Therefore, when the number of the signal pulses of FIG. 1(a) is divided into ½ by using a flip-flop, the output of the flip-flop relating the parity bits 21, 22, 23, 24, . . . , is fixed to "1" or "0", so long as no error occurs. FIG. 1(b) shows the output of the flip-flop. In FIG. 1(b), the numeral 3 shows the halved pulses divided from the block 11, and the signal "1" and/or "0" occurrs at random. A signal 4 is located at the bit position of the parity 21, and it is assumed that the signal 4 is "1". When an error occurs in a transmission line at the bit position 5, the number of marks of the block 13, which includes the parity 23, becomes odd (not even). Therefore, the output of the flip-flop is inverted to zero at location 41 which relates to the parity bit 23. Then, if no error occurs in the block 14, the output of the flip-flop does not change, and therefore, the output is still zero at location 42. Therefore, it should be noted that when there is a bit error and an even parity state is broken, the output of the flip-flop is inverted. The flip-flop is of course inverted if the parity bit is inverted purposely.

FIG. 1(c) shows the DC (direct current) component of the signal of FIG. 1(b) which is processed by a low-pass filter. As apparent in FIG. 1(c), the potential of the signal changes at the location where a bit error occurs. Accordingly, a terminal station may recognize the presence of a bit error by receiving the DC component through an interstitial cable.

When there are a plurality of repeaters coupled in series on a transmission line, the particular repeater must be identified. A prior identification of a repeater is now described. As shown in FIG. 2, an output of the flip-flop 8 is coupled with the interstitial cable 9 through the bandpass filter 10. It is assumed that a bandpass filter 10 of each repeater has its own center frequency $f_0$. A terminal station transmits a signal which has the frequency $2f_0$ and an odd parity as shown in FIG. 3(a). The output of the flip-flop 8 is the low frequency signal 6' of the frequency $f_0$ as shown in FIG. 3(b). When a bit error occurs at location 5, the number of marks in the block becomes even, and therefore, the output of the flip-flop does not change its potential as shown by numeral 7' in FIG. 3(b). Accordingly, a bit error in a repeater is recognized in a terminal station by sensing a period of an odd parity of a return signal.

However, the prior in-service method for monitoring repeaters has the disadvantage that an interstitial cable for merely monitoring is required. When a cable is long, an interstitial cable itself requires repeaters, and therefore, a prior system is not practical in economical consideration and operational reliability. Further, the prior art has a disadvantage in regard to its power supply. It should be noted that repeaters in a transmission line are coupled in series with a power supply line, and are supplied with constant current, so that repeaters operate with small supply current. However, as each repeater has a plurality of repeater circuits or regenerators for upwards circuits and downward circuit, the supply current from a terminal station is a multiple of the current which is required for each regenerator. When a number of repeater circuits or regenerators in a repeater is small (2 or 3 like a prior coaxial cable system), the multiple supply current raises no problem. However, in case of an optical fiber system in which more than 6 regenerators are mounted in each repeater, the supply current must be large, and that large supply current creates some problems in the system design.

Accordingly, the prior system in FIGS. 1 and 2, in which a DC component is transmitted over a plurality of repeater sections and a DC coupling exists relating to a power supply, is not advantageous in an optical transmission system in which each repeater has a plurality of regenerators, and each repeater is supplied with a constant current.

SUMMARY OF THE INVENTION

It is an object, therefore, of the present invention to overcome the disadvantages and limitations of a prior monitoring system by providing a new and improved monitoring system for a transmission system.

It is also an object of the present invention to provide a monitoring system which does not use an interstitial cable, and is useful for an in-service method for an optical transmission system which is supplied with constant current.

The above and other objects are attained by an optical repeater monitoring system for an optical digital transmission system having a pair of opposite direction lines (54,65) between transmission stations (51) and a plurality of repeaters inserted in the lines (54,65) with some intervals comprising:

(A) each of the repeaters has a pair of monitoring circuits (55, 55') each of which comprises;
  (a) a control command reception circuit (60) for receiving a control command in a first line (54),
  (b) a flip-flop (57) for dividing the frequency of a signal in the first line (54) to derive control commands and a burst carrier,
  (c) a counter means (59, 61) for detecting parity errors in the second line (65) and for counting errors,
  (d) a timing generation circuit (62) for reading the counter means upon detection of the burst carrier in the first line,
  (e) a phase modulator (64) for performing phase modulation to a clock pulse in the second line (65) according to content of the counter means. The optical repeater monitoring system further includes
(B) control commands and the burst carrier being constituted by arranging parity bits of in-service data in the first line (54); and
(C) the terminal transmitter (52) sends a first control command and a second control command for instructing all the repeaters to count errors in the second line (65) and to store the number of errors in the counter means. A third control command instructs designated repeater to return errors to the terminal station (51), and a burst carrier carries errors in the counter means to the terminal station (51) by phase modulation of clock pulses for in-service data in the second line (65).

BRIEF DESCRIPTION OF THE DRAWINGS

The foregoing and other objects, features, and attendant advantages of the present invention will be appreciated by means of the following description and accompanying drawings wherein;

FIG. 7 shows the timing sequence of the operation of the present system.

DESCRIPTION OF THE PREFERRED EMBODIMENTS

Figure 4:
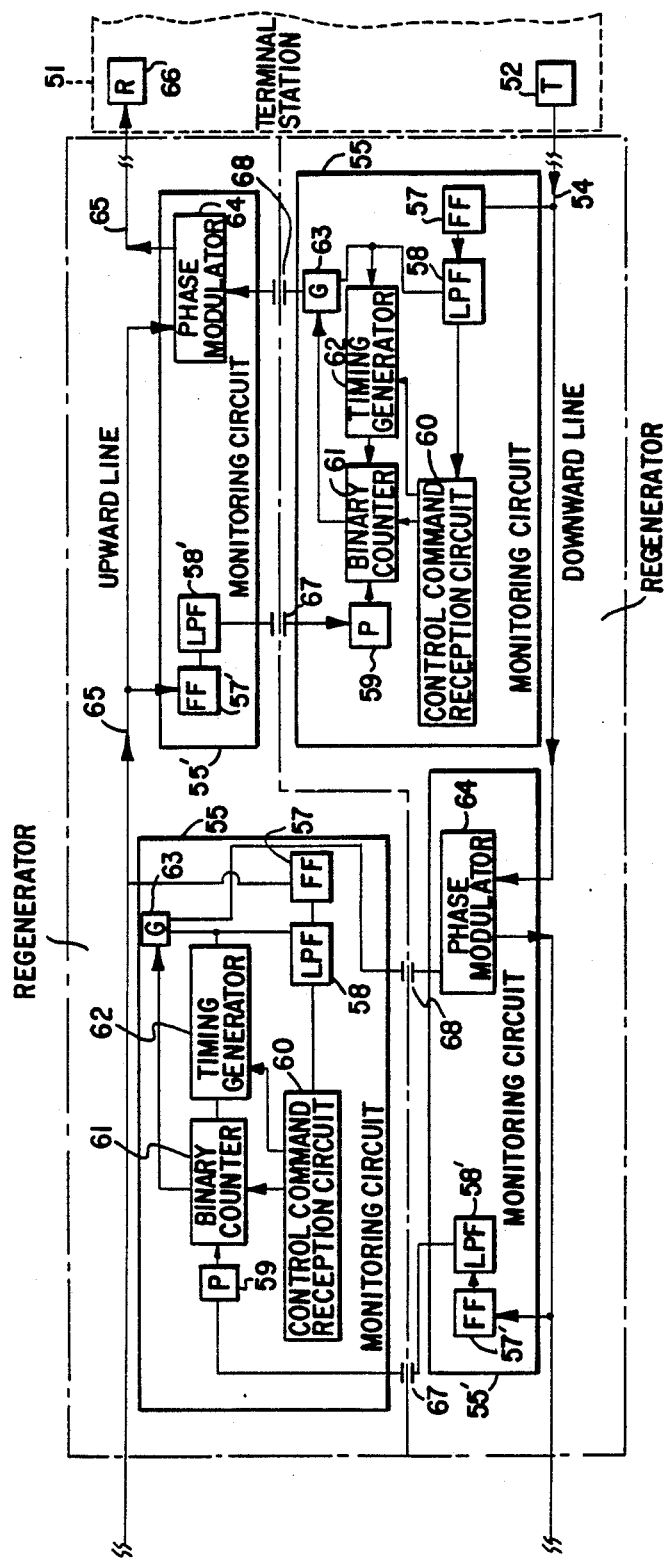
FIG. 4 is a block diagram of the repeater according to the present invention.

FIG. 4 shows a block diagram of the monitoring system according to the present invention. In the figure, the numeral 51 is a terminal station on land, 52 is an optical transmitter, 54 is a downward transmission line, 65 is an upward transmission line, 55 and 55' are monitoring circuits provided for each regenerator, 57 and 57' are flip-flops for frequency division, 58 and 58' are low-pass filters (LPF) for erasing undesired high frequency component, 59 is a parity error detection circuit, 60 is a control command reception circuit, 61 is a binary counter, 62 is a timing generator for reading the content of the binary counter 61, 63 is a gate circuit, 64 is a clock phase modulation circuit, 66 is an optical signal receiver, and 67 and 68 are capacitors.

FIG. 4 shows the embodiment that an error in an upward line 65 is monitored by the control in the downward line 54. The monitoring in an opposite direction line 54 is of course accomplished in a similar manner. A regenerative amplifier in a repeater is not shown for the sake of the simplicity of the drawing.

In the explanation of the present invention, it is assumed for ease in understanding that the transmission signal from the optical transmitter 52 to the optical fiber cable 54 has the communication speed of 291.2 Mbps (megabits per second), has even parity for every 25 bits, and is in the form of a frame with 1400 bits. In the present embodiment, a parity bit in every 5600 bits (4 frames) is processed.

Assume that the optical transmitter 52 sends a signal with all the parity bits in every 5600 bits inverted (that is to say, an odd parity system is used). When the flip-flop 57 in the repeater divides the reception signal frequency into ½, the output of the flip-flop 57 is the pulse train with 26 kbps (=291.2(×1000)/(5600×2)). As that pulse train is a binary signal, it can take any desired combination of '1' and '0', and we call that binary code a control command. The first control command is for starting a measurement, the second control command is for stopping a measurement, and the third control command is for designating a particular repeater to return back measured error data. The control commands are defined beforehand. The first control command, and the second control command are common to all the repeaters, and the third control command is a binary code which depends upon each repeater.

As a parity bit in every 5600 bits is changed for testing purposes, the reception station of the line 54 recognizes the parity change as if an error occurs in every 5600 bits in in-service communication data. That error is tolerable since the error rate (1/5600) by the test is far less than the parity bit intervals (1/25).

The signal on the line 54 from the optical transmitter 52 is divided by the flip-flop 57, and then, applied to the control command reception circuit 60 through the low pass filter 58. The control command reception circuit 60 is a pattern detector comprising a memory for storing output of the flip-flop 57, a shift register, a binary code memory for storing the three control commands, and a comparator for comparing the content of the binary code memory with the content of the shift register.

In the initial operation, the first control command is sent to the downward transmission line 54. Upon detection of the first control command by the control command reception circuit 60, the binary counter 61 is reset to zero by the output of the control command reception circuit 60, and the number of parity errors in the upward transmission line 65 is counted by the binary counter 61.

Figure 1:
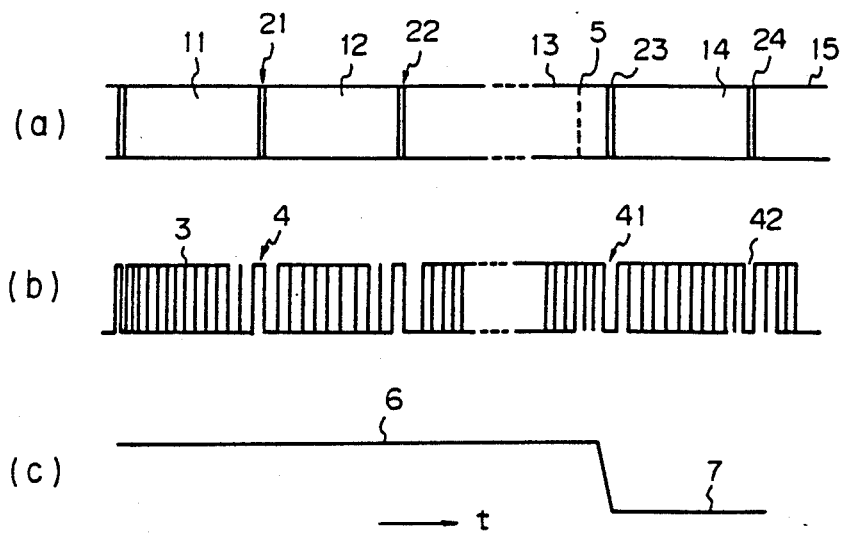
FIG. 1 shows signal waveforms in an in-service method.
Figure 2:
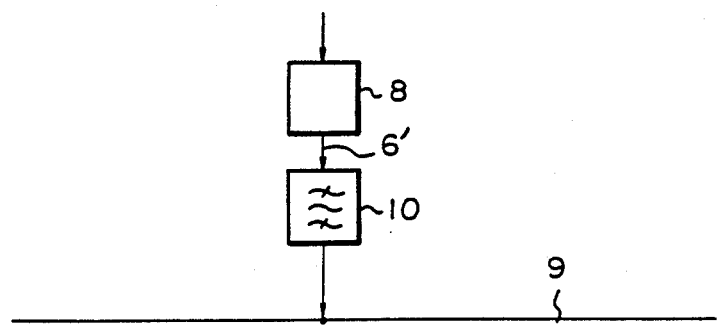
FIG. 2 is a block diagram of a recognizer.
Figure 3:
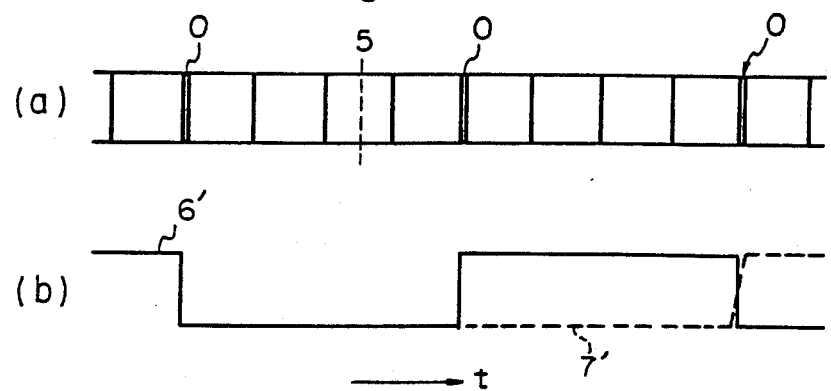
FIG. 3 shows waveforms for the explanation of the operation of FIG. 2.

A parity error is detected on the principle as mentioned in accordance with FIG. 1, in which the signal on the upward line 65 is divided by the flip-flop 57' which provides the output potential showing a transmission error. The potential is applied to the parity error detection circuit 59 through the capacitor 67. The capacitor 67 functions as a differentiation circuit, and therefore, the parity error detection circuit 59 has only to detect a positive pulse and a negative pulse. The detector 59 provides an output pulse following a pair of positive and negative pulses, and the output pulse of the detector 59 is applied to the binary counter 61, which counts the number of errors.

When a predetermined duration for counting parity errors elapses, the optical transmitter 52 sends the second control command to the downward line 54. Upon detection of the second control command, the control command reception circuit 60 stops the binary counter 61. As mentioned before, the first control command and the second control command are common to all the repeaters, a binary counter 61 in each repeater stores the number of errors detected in its own repeater.

Next, the optical transmitter 52 forwards the third control command to the downward line 54. The control command reception circuit 60 of the repeater designated by the third control command triggers the timing generation circuit 62, upon detection of the third control command.

Figure 5:
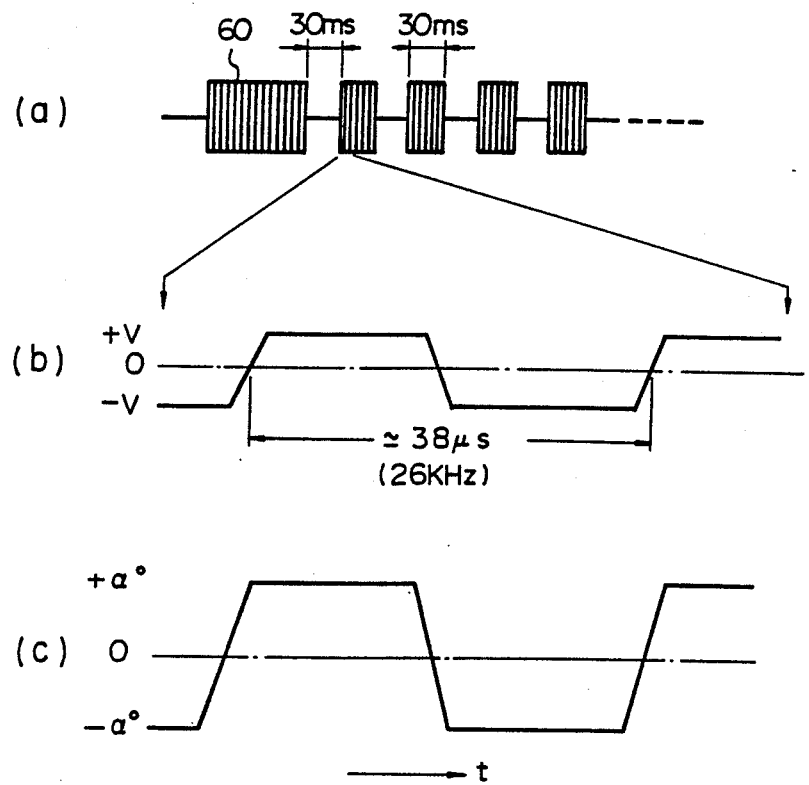
FIG. 5 shows burst carrier waveforms.

Next, the optical transmitter 52 transmits a burst carrier which is shown in FIG. 5. In the embodiment, the burst carrier has the low frequency component of 26 KHz, which is obtained from the clock pulse of 291.2 MHz by processing the same similar to the parity conversion mentioned before. The burst carrier has the repetition period of 30 msec.

The lowpass filter 58 derives the low frequency component of 26 KHz in the burst carrier, therefore, the output of the lowpass filter 58 is the burst signal of 26 KHz. The timing generator 62, upon receiving the burst signal of 26 KHz, generates a timing pulse for reading out a bit of the binary counter 61 at the rising point of the burst signal. This output of the binary counter 61 is applied to the gate circuit 63. If the output of the binary counter 61 read out by the timing pulse is "1", the gate circuit 63 opens, and the burst carrier of 26 KHz is applied to the phase modulator 64, which performs the phase modulation to the clock pulse regenerated in the repeater, according to the output of the gate circuit 63. The phase shift by the phase modulator 64 is small, and is preferably less than 15° so that no additional error happens in the upward transmission line 65.

The optical receiver 66 detects the phase modulated reception clock signal as jitters of the reception clock signal. That is to say, if jitters are detected in every 30 msec (which is the burst period of the burst carrier), the reception signal is recognized to be "1", and if jitters are not detected, the reception signal is zero. Thus, the optical receiver 66 can read the content of the binary counter 61 in the designated repeater by detecting a jitter of a reception clock pulse, so that the number of parity errors detected in the repeater is recognized in the optical receiver 66.

Next, another third control command for designating another repeater is forwarded to the transmission line 54 together with the burst carrier, so that the number of parity errors in the other repeater is measured. By repeating the above operation, the parity error in all the repeaters is measured.

FIG. 5 shows said burst carrier, in which FIG. 5(a) shows said burst carrier, FIG. 5(b) shows the low frequency component in the burst carrier, and FIG. 5(c) shows the phase of the clock signal which is phase-modulated by the low frequency component. The symbol 60 in FIG. 5(a) is a preamble which is longer than other bursts so that the beginning of the burst is detected by using the preamble.

Figure 6:
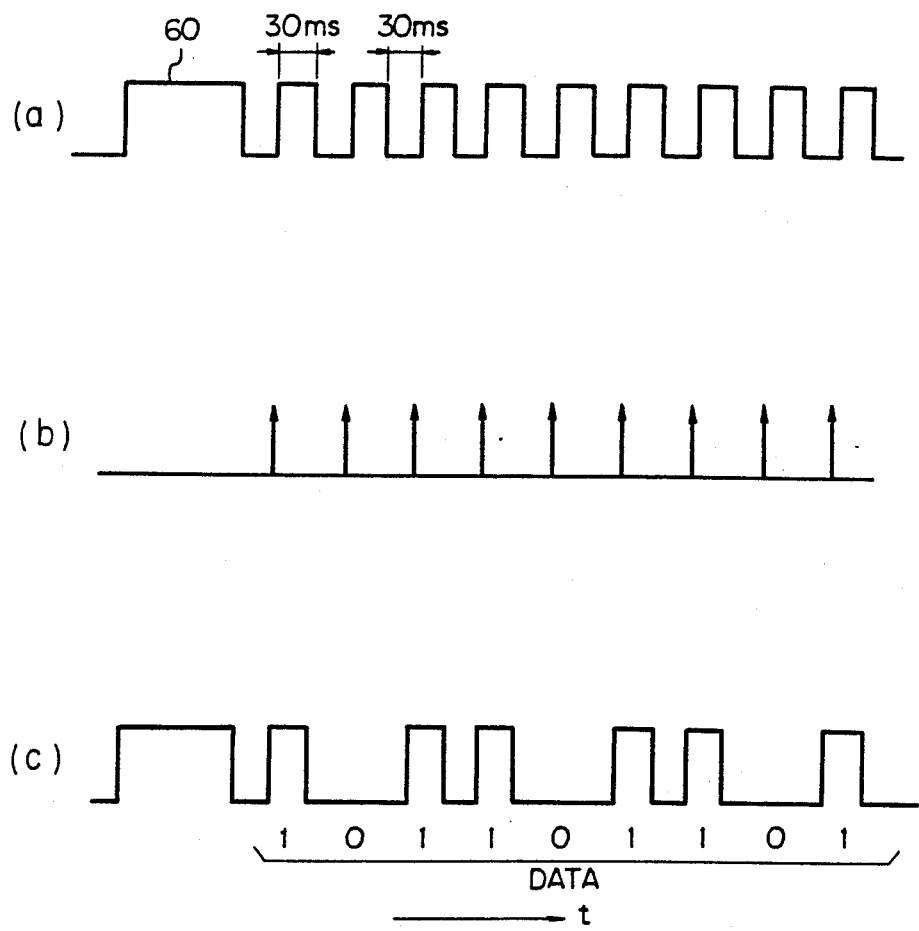
FIG. 6 shows timing sequence of each signals.

FIG. 6 shows the burst carrier to be transmitted (FIG. 6(a)), the read timing of the binary counter 61 (FIG. 6(b)), and the reception signal (FIG. 6(c)). A transmission delay time is omitted in FIG. 6. In the embodiment of FIG. 6, the content of the binary counter 61 of the designated repeater is (101101101).

FIG. 7 shows the time sequence of the operation of the present invention, where T shows the signal sent by the transmitter 52, M shows the operation of a repeater, and R shows the reception clock pulses received by the receiver 66. As shown in T, the transmitter 52 sends the first control command (1), and the second control command (2). During those control commands, all the repeaters count the errors. Then, the transmitter 52 sends the third control command $3_1$ and the burst carrier $B_1$ to designate the particular repeater, which then sends the measured data by jitters of the clock pulses. The third command and the burst carrier are forwarded repetitively by designating another repeater in sequence, and the receiver 66 receives the error information of each repeater at the timing of the related burst carrier.

Some advantages obtained by the present invention are enumerated below.

(a) No interstitial cable for measuring errors is requested, and therefore, construction cost of a transmission system may be small.

(b) A throughput of communication is not decreased by measuring error rates.

(c) As the return signal from a repeater is a phase modulation of a clock signal, data signal quality is not deteriorated by measuring errors.

(d) A transmission line 65 which is subject to a measurement, is separated from a transmission line 54 for control which is quite normal. Therefore, stable and correct control is obtained.

(e) A test signal for measuring errors in an ordinary commercial data signal and is not a test signal for test purposes only. Therefore, an accurate practical error rate is measured.

(f) As all the repeaters measure errors simultaneously, even when an error is an intermittent one which occurs in a short time, a fault location by a single measure is possible.

(g) No DC (direct current) coupling exists in each circuit in a repeater. Therefore, the power consumption in constant current supply is reduced.

Accordingly, the present invention is advantageous in both operation and maintenance of a transmission system.

Although an optical cable is described as an embodiment, the present invention is applicable to other digital transmission systems so long as it has a parity bit, and a transmission is accomplished in a block.

From the foregoing it will now be apparent that a new and improved digital transmission system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical repeater monitoring system for an optical digital transmission system, said optical repeater monitoring system comprising:
   transmission stations having terminal transmitter means for transmitting control commands and a burst carrier;
   a pair of opposite direction lines between said transmission stations, said pair of opposite direction lines being a first line and a second line;
   a plurality of repeaters inserted in said lines, each of said repeaters having at least a pair of regenerators, each of said regenerators having a pair of monitoring circuits, said monitoring circuits includes, a flip-flop means for dividing frequency of signals in said first line to derive said control commands and said burst carrier, a command control reception means for receiving and for detecting said control commands and said burst carriers in said first line from said flip-flop means, a counter means for detecting parity errors in said second line and for counting parity errors, a timing generation means for reading said counter means when said control command reception means detects said burst carrier in said first line, and a phase modulator means for performing phase modulation to a clock pulse derived from said second line according to a binary code in said counter means, wherein said control commands and said burst carrier being constituted by arranging parity bits of in-service data in said first line, said control commands including first, second and third control commands, said first control command for controlling said plurality of repeaters to start said error counting in said second line and to store the number of errors in said counter means, said second control command for controlling said plurality of repeaters to stop said error counting in said second line, said third control command for designating a particular regenerator to return errors to said transmission station, and said burst carrier for sending errors from said counter means to said transmission station, said errors being sent by phase modulation of clock pulses for in-service data in said second line.

2. An optical repeater monitoring system according to claim 1, wherein a low pass filter is provided at an output of said flip-flop means (57) to derive low frequency component signals which include said control commands and said burst carrier and also to derive a DC level shift due to parity errors on line signals.

3. An optical repeater monitoring system according to claim 1, wherein a terminal receiver (66) recognizes monitor data in said second line (65) based on said burst carrier sent by said terminal transmitter (52) by detecting whether or not received in-service clock pulses contain jitters.

4. An optical repeater monitoring system according to claim 1, wherein each of said monitoring circuit (55, 55') has a gate circuit (63) for passing said burst carrier according to output of said counter means, said gate circuit being connected to said counter means, a gate circuit output (63) being applied to said phase modulator means (64) to perform said phase modulation to said clock pulses in said second line (65).

* * * * *